United States Patent
Reinbold et al.

(10) Patent No.: US 9,800,698 B1
(45) Date of Patent: Oct. 24, 2017

(54) METHOD AND APPARATUS FOR ORDERING PACKETS, ASSOCIATED WITH DIFFERENT STREAMS OF DATA, IN A SINGLE QUEUE PRIOR TO TRANSMISSION OF THE PACKETS IN A NETWORK

(71) Applicant: MARVELL INTERNATIONAL LTD., Hamilton (BM)

(72) Inventors: Lukas Reinbold, Oberkirch-Stadelhofen (DE); Thomas Kniplitsch, Insheim (DE)

(73) Assignee: MARVELL INTERNATIONAL LTD., Hamilton (BM)

( * ) Notice: Subject to any disclaimer, the term of this patent is extended or adjusted under 35 U.S.C. 154(b) by 162 days.

(21) Appl. No.: 14/327,733

(22) Filed: Jul. 10, 2014

Related U.S. Application Data (60) Provisional application No. 61/845,537, filed on Jul. 12, 2013.

(51) Int. Cl.
  *H04J 3/16* (2006.01)
  *H04L 29/08* (2006.01)
  *H04L 12/841* (2013.01)

(52) U.S. Cl.
  CPC ............ *H04L 69/324* (2013.01); *H04L 47/28* (2013.01)

(58) Field of Classification Search
  None
  See application file for complete search history.

(56) References Cited

U.S. PATENT DOCUMENTS

| | | | | |
|---|---|---|---|---|
| 2005/0207419 | A1* | 9/2005 | Kohzuki | H04L 12/5693 370/392 |
| 2008/0137685 | A1* | 6/2008 | Gunaseelan | H04N 21/23406 370/468 |
| 2010/0020685 | A1* | 1/2010 | Short | H04L 12/14 370/230 |

\* cited by examiner

*Primary Examiner* — Christopher Crutchfield
*Assistant Examiner* — Alan Lindenbaum (57) ABSTRACT

Systems, methods, and other embodiments associated with ordering packets into a transmission order within a queue are described. According to one embodiment, an apparatus includes shaper logic configured to (i) respectively determine launch times for packets received from a host bus, and (ii) order the packets into a transmission order according to the launch times. The launch times are expected transmission times for the packets that are provided according to one or more attributes associated with each respective one of the packets. The apparatus includes a queue configured to store the packets in the transmission order for transmission onto a network in a single stream. The shaper logic is configured to merge the packets from multiple streams into the transmission order when providing the packets to the queue.

20 Claims, 6 Drawing Sheets

METHOD AND APPARATUS FOR ORDERING PACKETS, ASSOCIATED WITH DIFFERENT STREAMS OF DATA, IN A SINGLE QUEUE PRIOR TO TRANSMISSION OF THE PACKETS IN A NETWORK

CROSS REFERENCE TO RELATED APPLICATIONS

This patent disclosure claims the benefit of U.S. Provisional Application Ser. No. 61/845,537 filed on Jul. 12, 2013, which is hereby wholly incorporated by reference.

BACKGROUND

Communication networks may be used to stream multimedia data to various computing and electronic devices. However, difficulties may be encountered in providing streamed multimedia data over a network. For example, video streamed over a network may suffer from pauses in images and/or glitches in sound when associated multimedia data does not arrive on-time at a device on which the video is being presented.

Accordingly, to enable reliable presentation of the streamed multimedia data, the communication networks may be time aware. For a network to be time aware, compliance with timing constraints are followed that include providing multimedia data at scheduled transmission intervals. These scheduled transmissions are intended to provide timely delivery of the multimedia data to devices so that difficulties with quality (e.g., pauses and/or glitches) can be avoided.

SUMMARY

In general, in one aspect this specification discloses an apparatus. The apparatus includes shaper logic configured to (i) respectively determine launch times for packets received from a host bus, and (ii) order the packets into a transmission order according to the launch times. The launch times are expected transmission times for the packets that are provided according to one or more attributes associated with each respective one of the packets. The apparatus includes a queue configured to store the packets in the transmission order for transmission onto a network in a single stream. The shaper logic is configured to merge the packets from multiple streams into the transmission order when providing the packets to the queue.

In general, in another aspect, this specification discloses a method. The method includes determining launch times for packets received from a host bus. The method includes ordering the packets into a transmission order according to the launch times. The launch times are expected transmission times for the packets. The launch times are provided according to one or more attributes associated with each respective one of the packets. The method includes storing the packets in a queue in the transmission order for transmission onto a network. Storing the packets in the queue merges the packets from multiple streams into the transmission order for providing the packets in a single stream.

In general, in another aspect, this specification discloses a device. The device includes shaper units that are connected to a bus-side arbiter. The bus-side arbiter provides packets from a host bus. The shaper units are configured to respectively determine a launch time for each of the packets according to transmission characteristics of each packet. The shaper units each include an output. The device includes a queue arbiter connected to outputs from the shaper units. The queue arbiter is configured to arrange the packets in an order for transmission according to the launch time of each of the packets. The device includes a queue that includes an input connected to the queue arbiter. The queue is configured to store the packets in the order for transmission as arranged by the queue arbiter.

BRIEF DESCRIPTION OF THE DRAWINGS

The accompanying drawings, which are incorporated in and constitute a part of the specification, illustrate various systems, methods, and embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with ordering packets associated with multiple streams into a transmission order using a single queue. Streaming multimedia data involves transmitting several different streams of packets. The different streams of packets have different classes of service or priorities at which the different streams are provided. For example, when streaming video, an image portion of the video may have a first class of service while an audio portion may have a second class of service. This is because the audio may use less bandwidth than the video and thus does not use as high of a priority or bandwidth allocation as the video. Accordingly, the audio and video are assigned separate classes of service in order to provide for transmitting the respective packets at appropriate times.

However, the packets are initially received from a host bus in an unordered arrangement. That is, packets with a later launch time (i.e., transmit time) may be received before packets with an earlier launch time. As mentioned previously, in some embodiments, packets are distributed between multiple different queues depending on a class of service. By contrast, in one embodiment, the packets are pre-ordered according to launch times and stored in a single queue. Thus, the single queue stores the packets in a correct order for transmission. In this way, one queue can be used for the packets instead of using multiple queues.

Figure 1:
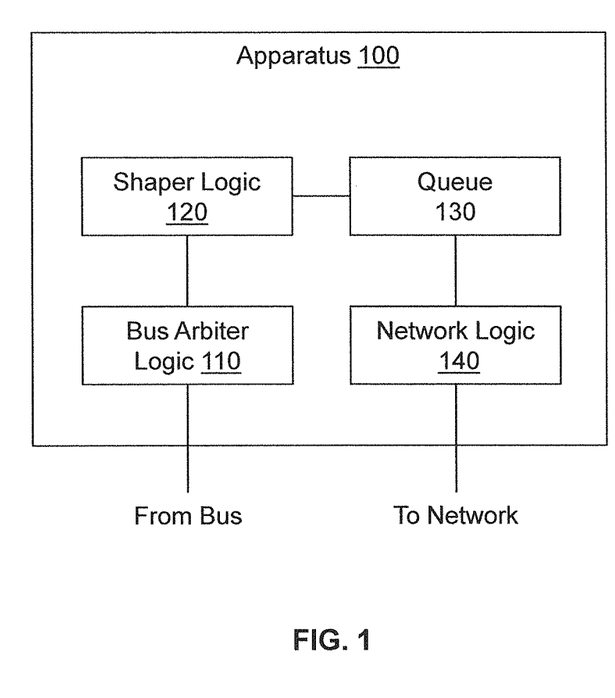
FIG. 1 illustrates one embodiment of an apparatus associated with merging multiple queues into a single queue by pre-ordering packets.

With reference to FIG. 1, one embodiment of an apparatus 100 is shown that is associated with pre-ordering data into a single queue. The apparatus 100 may be implemented in a network communication device, a host bus and/or as a combination of the two. The apparatus 100 includes bus arbiter logic 110, shaper logic 120, a queue 130 and network logic 140.

In one embodiment, the bus arbiter logic 110 is connected to a host bus or other communication pathway of a host device. In general, the host device is a computing device that provides multimedia communications onto a network for communication to one or more remote client devices. Accordingly, the bus arbiter logic 110 is configured to receive packets for the communications from the host bus.

The packets may include multimedia data (e.g., video, audio, etc.), non-multimedia data (e.g., application data) and so on. Thus, depending on whether the packets should arrive at a client device at particular time (i.e., time aware packets) the packets are characterized differently. For example, different packets may be grouped into a different class of service, different bandwidth allocation groups and so on. The packets may be grouped separately so that packets associated with media streams can be transmitted in a way that maintains, for example, quality of a media stream at a client device. Therefore, a respective packet is characterized accordingly to data being carried by the packet.

In one embodiment, the bus arbiter logic 110 provides the packets as the packets are received to the shaper logic 120. The shaper logic 120 may include separate shaper units (not illustrated). Each of the separate shaper units is associated with a different class of service, different virtual queues, or, more generally, each of the shaper units is associated with a group of data that has different characteristics. Accordingly, the arbiter logic 110 distributes the packets to an associated shaper unit of the shaper logic 110 according to attributes of the data (e.g., class of service or virtual queue).

In general, each shaper unit of the shaper logic 120 operates similarly but on data of a different class. Accordingly, the shaper logic 120 will be discussed instead of referencing individual shaper units for simplicity of discussion. In one embodiment, the shaper logic 120 is configured to perform multiple tasks. For example, the shaper logic 120 performs direct memory access (DMA) functions for received packets of data. The shaper logic 120 also shapes packets for transmission. That is, as the shaper logic 120 prepares the packets for transmission.

Because various different packets are configured differently, the shaper logic 120 prepares packets differently depending on one or more attributes of each of the packets. Accordingly, the attributes may include various characteristics as mentioned previously. For example, the attributes may include a class of service, bandwidth allocation, a virtual queue assigned to a packet, a type of stream associated with a packet and so on. In general, the packets may be classified according to any determinable characteristic.

Furthermore, the shaper logic 120 determines a launch time for each of the packets. For example, if a packet is part of a multimedia stream, then the packet may already include a launch time. The launch time is a time at which the packet is expected to be transmitted or released onto the network. Depending on the packet, the launch time may be provided to ensure continuity of data at a receiving device so that no difficulties in playback of media arise. That is, each packet in, for example, a multimedia stream has a specified launch time in order to ensure packets from the multimedia stream are providing at appropriate transmission intervals to maintain playback quality of associated media.

However, not all packets are time aware and include a launch time. For example, packets associated with generic application data may not be time aware and thus may not include a launch time.

Accordingly, for packets that do not include a launch time, the shaper logic 120 calculates the launch time. In one embodiment, the shaper logic 120 calculates a launch time for a packet by using an allocated bandwidth associated with the packet, a size of a previous packet in a same stream as the packet and a launch time of the previous packet. From these values the shaper logic 120 calculates a delta value that indicates a time after transmission of the previous packet when the packet should be transmitted. In general, the current packet and the previous packet are of a same class of service or stream. Thus, reference to a previous packet is intended to be a packet of a same stream and not necessarily an immediately previous packet that was transmitted overall.

The shaper logic 120 is configured to use launch times for the packets when arranging the packets into a transmission order. That is, the shaper logic 120 orders packets according to a launch time for each packet so that the packets can be placed into an order for transmission. In this way, the shaper logic 120 orders packets from multiple streams into a single stream for transmission.

Furthermore, some of the packets may have an identical or nearly identical launch time. When two or more packets have a same launch time a conflict occurs between which of the two or more packets should be ordered first in the transmission order. Thus, the shaper logic 120 resolves conflicts in the transmission order by providing whichever packet that has a higher priority or class of service with preference. In this way, streams with, for example, a higher priority are not interrupted by packets from a lower priority that have a same launch time being transmitted instead.

Continuing with ordering the packets, as the shaper logic 120 orders the packets, the packets from the various shaper units of the shaper logic 120 are merged and stored in the queue 130. Thus, multiple separate streams of packets are combined into a single stream within the queue 130.

In one embodiment, the queue 130 is a buffer, register or other memory device. Additionally, the queue 130 may be a first-in first-out queue. A first-in first-out queue is a type of queue that provides an oldest entry at a head of the queue 130. Thus, the oldest entry or first-in will be a first entry out of the queue 130. In this way, packets can be added to the queue continuously without re-arranging the transmission order and while packets at a head of the queue 130 are being released onto the network.

Thus, an order of the packets in the queue 130 is a single stream that is a transmission order. The transmission order is a pre-ordered arrangement of the packets that is an order by which the packets will be released onto the network. Thus, the transmission order is a final correct order of the packets for transmission. By ordering the packets according to a final transmission order, a single queue can be used instead of using a separate individual queue for each different class of service or stream of data.

Furthermore, the network logic 140 releases a packet from the queue 130 when a launch time for the packet matches a current time and when the packet is next in the transmission order to be sent. As mentioned previously, the queue 130 is a first-in first-out queue. Thus, packets are released from the queue 130 onto the network according to a first-in first-out basis. That is, when a packet is at a head of the queue 130 (e.g., an oldest packet) and a launch time of the packet matches a current time, the network logic 140 will release the packet for transmission.

In a case where two packets conflict, as discussed previously, a packet with a higher priority is first released. A second packet with a same launch time may have a toggle bit set to indicate that the second packet should be transmitted immediately after the previous packet without, for example, checking a launch time against a current time. In general, the toggle bit indicates that the second packet is from a different queue than the packet with a higher priority. Thus, the second packet is delayed only by however much time the higher priority packet takes to be transmitted.

Therefore, packets associated with audio-video bridging (AVB), Time Sensitive Network (TSN), and other data streaming techniques can be assigned to separate virtual queues while using a single queue to store all of the packets without using multiple hardware queues. In this way, inefficiencies associated with redundant hardware queues can be avoided.

Figure 2:
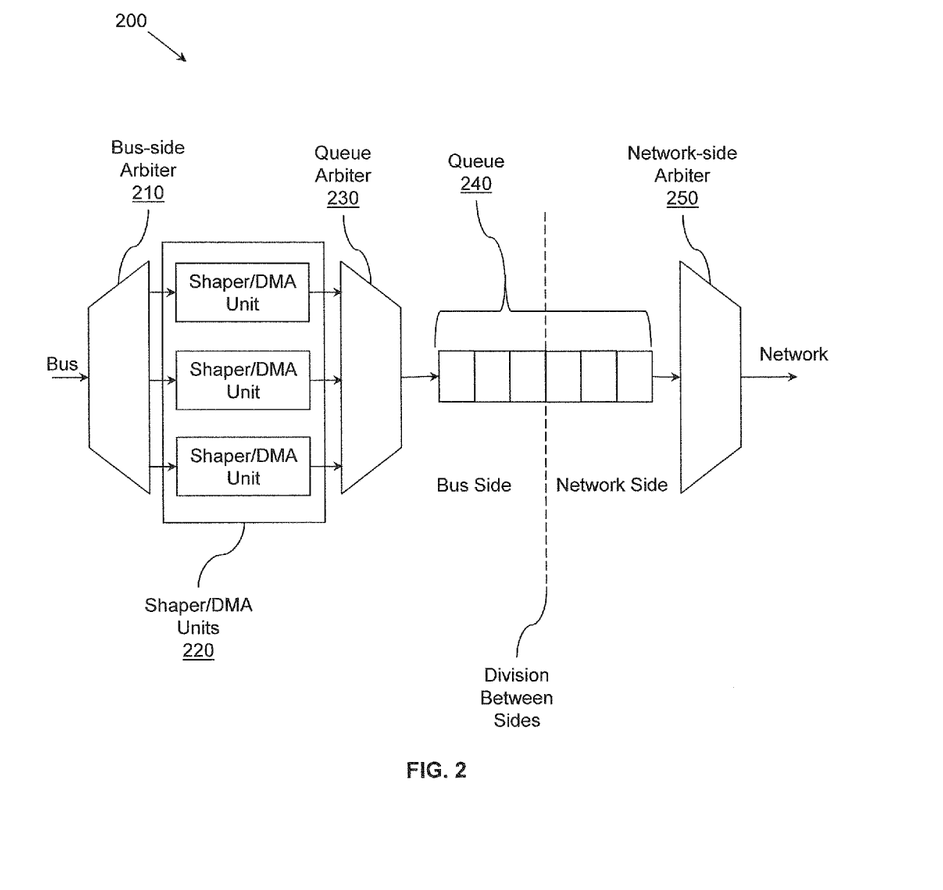
FIG. 2 illustrates one embodiment of a device associated with using a single first-in first-out queue when transmitting multimedia data.

Further aspects of arranging streams of packets into a single queue according to a transmission order will now be discussed in relation to FIG. 2. FIG. 2 illustrates one embodiment of a device 200 associated with using a single queue to transmit multimedia data streams.

The device 200 includes a bus-side arbiter 210, shaper/DMA units 220 (hereinafter generally referred to as shaper units 220 for purposes of simplicity), a queue arbiter 230, a queue 240 and a network arbiter 250. The bus-side arbiter 210, the queue 240 and the network arbiter 250 are similar to the bus arbiter logic 110, the queue 130 and the network logic 140 respectively of FIG. 1.

However, the shaper units 220 differ from the shaper logic 120 as discussed with FIG. 1. For example, the shaper units 220 are illustrated with three individual shaper units that are each connected to the queue arbiter 230. Accordingly, the shaper units 220 are each associated with a different virtual queue. A virtual queue is an abstract construct that is used to classify packets/data received from the bus. Thus, each of the shaper units 220 is associated with one or more virtual queues and processes packet for the one or more virtual queues.

In one embodiment, the device 200 classifies different packet streams and/or classes of service associated with the different packet streams to different virtual queues. Accordingly, the device 200 can differentiate between the different streams of data without using separate hardware queues. Thus, as the bus-side arbiter 210 receives various packets from a host device via the bus, the bus-side arbiter 210 distributes the packets to different ones of the shaper units 220 according to a virtual queue assigned to each of the various packets.

Subsequently, the shaper units 220 perform direct memory access (DMA) functions and also shape the packets by determining a launch time for each packet. As discussed previously, some packets (e.g., audio video bridging (AVB) packets) already include a launch time. In general, packets that include a launch time are time-aware packets. These packets generally include multimedia data that is being streamed to remote devices. Thus, for the multimedia stream to remain error free and uninterrupted the packets include a launch time to help ensure they are transmitted at appropriate times.

Other packets may be asynchronous (e.g., time independent) or may lack a launch time for other reasons. In either case, for packets without a launch time, the shaper units 220 calculate an appropriate launch time. In one embodiment, the shaper units 220 calculate launch times by determining a delta value or time to transmit a next packet in a stream based on when a previous packet in the stream was transmitted. The shaper units 220 may calculate the launch time of a packet according to a bandwidth associated with the stream, a size of the packet or of the previous packet and when the previous packet was transmitted.

Once a packet has a launch time, the shaper units 220 pass the packet to the queue arbiter 230. The queue arbiter 230 is a multiplexer that is configured to sort/order packets into the queue 240. In one embodiment, the queue arbiter 230 orders packets according to the launch times. In this way, an order of the packets as stored in the queue 240 is a transmission order. That is, the packets are placed in a final order as they will be transmitted onto the network. In this way, the device uses only a single queue where other embodiments use a separate queue for each different stream.

Furthermore, the bus-side arbiter 210, the shaper units 220, the queue arbiter 230 and a portion of the queue 240 are illustrated as being on a bus-side of the device 200, while a remaining portion of the queue 240 and the network arbiter 250 are illustrated as being on a network side. The bus side and the network side refer to a location in hardware of the components. In one embodiment, the bus side components are integrated with a bus of a host device (e.g., a bus controller) while the network side elements are integrated with a network interface card (NIC). By maintaining the bus-side arbiter 210, the shaper units 220, the queue arbiter 230 and portions of the queue 240 on the bus side, improved speed is realized by those components in contrast to if the components 210, 220 and 230 were located on the network side.

Figure 3:
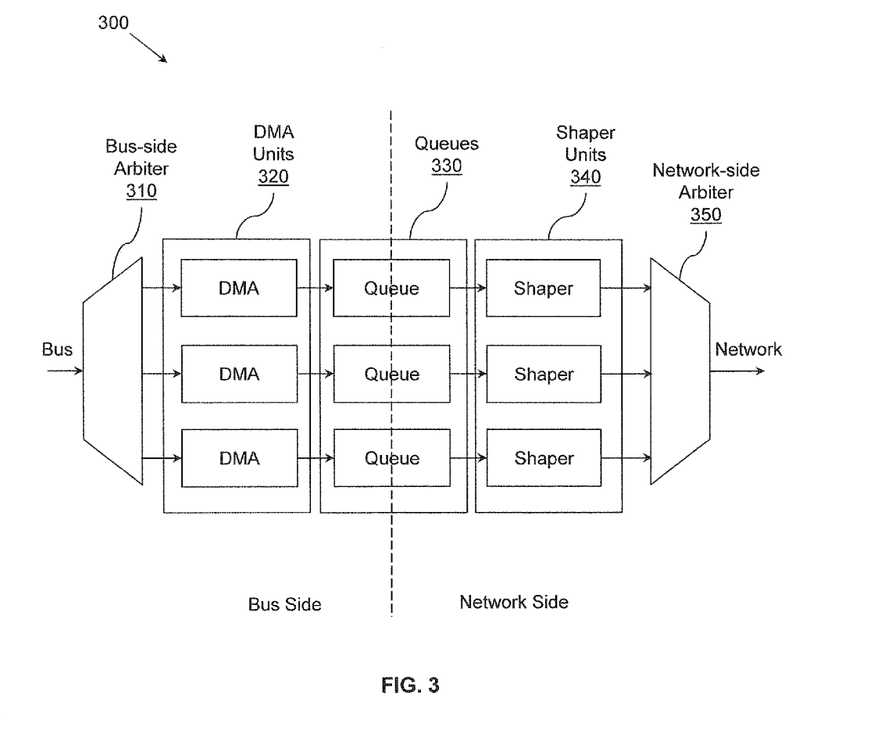
FIG. 3 illustrates one embodiment of a device for transmitting data.

For example, consider the device 200 of FIG. 2 in contrast to FIG. 3. FIG. 3 illustrates one embodiment of a device 300 associated with shaping network communications for multiple streams of data. In one embodiment, the device 300 includes a bus-side arbiter 310, DMA units 320, multiple queues 330, shaper units 340 and a network side arbiter 350. Instead of using a single queue, as in the device 200 of FIG. 2, the device 300 uses multiple queues 330 with each of the queue 330 associated with a different stream of data.

Comparing the device 300 of FIG. 3 with the device 200 of FIG. 2 shows that the device 300 includes additional queues and includes additional components on the network side. For example, as illustrated the device 300 includes three separate queues 330. Implementing the queues 330 in this way uses additional hardware beyond a single queue as seen in the queue 240 of FIG. 2. Accordingly, the device 300 consumes a greater area on-chip than the device 200.

Furthermore, the device 300 includes the separate shaper units 340 on a network side and DMA units 320 on a bus side while the device 200 of FIG. 2 includes a combined DMA and shaper in the shaper/DMA units 220 on a bus-side of the device 200. Accordingly, because the bus side operates, for example, at a higher rate, the combined DMA/shaper units 220 of the device 200 operate at a higher rate than the shaper units 340 of FIG. 3. Additionally, other aspects of the device 300, such as the network-side arbiter 350, perform additional functions of sorting packets as the packets are released onto the network. Sorting the packets in this way can increase a processing load on network side components, which already operate at a lower rate than the bus side components.

Figure 4:
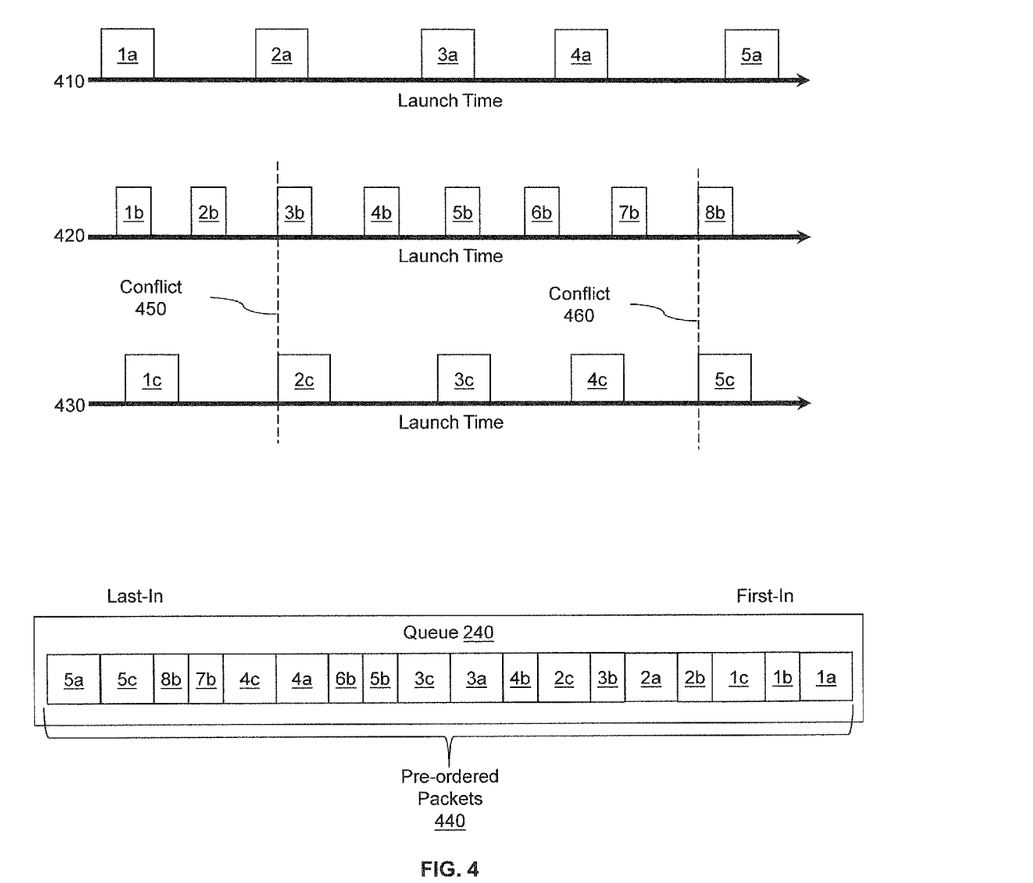
FIG. 4 illustrates one example of ordering packets from multiple streams into a single queue.

Further aspects of ordering packets from multiple streams into a single queue for transmission will be discussed in reference to an example of FIG. 4. FIG. 4 illustrates one example of how packets may be ordered into the queue 240 of FIG. 2. For purposes of explanation FIG. 4 will be discussed from the perspective of the device 200 of FIG. 2.

FIG. 4 includes three separate streams of packets 410, 420 and 430 that are each illustrated on a separate timeline. The timeline illustrates launch times for packets but does not indicate when the bus-side arbiter 210 receives the packets. Each of the streams 410, 420, and 430 are associated with a different virtual queue a, b, and c respectively. The virtual queues a, b, and c are abstract constructs that are used only to classify the different streams 410, 420 and 430. Additionally, while only three streams and three virtual queues are discussed, of course in other embodiments more virtual queues and streams may be implemented.

The separate streams 410, 420 and 430 and associated virtual queues each have different transmission characteristics. The transmission characteristics may include transmission priority, bandwidth allocation, class of service, quality of service and so on. In any case, the device 200 receives the separate streams asynchronously from a host device and arranges the packets of the streams 410, 420 and 430 into the queue 240, as shown.

Accordingly, as the bus-side arbiter 210 receives packets for the separate streams, the packets are provided to one of the shaper units 220 associated with a virtual queue of the stream. In this example, assume that the top shaper unit is associated with virtual queue a, a middle shaper unit is associated with virtual queue b, and a bottom one of the shaper units 220 is associated with virtual queue c.

Accordingly, the shaper units 220 determine launch times for the packets by retrieving the launch times from the packets or calculating the launch times depending on a packet type (i.e., time aware or not). Consequently, the separate timelines in FIG. 3 unfold for the launch times. Subsequently, the queue arbiter 230 arranges the packets into the queue 240, thereby providing the pre-ordered arrangement of packets 440. The pre-ordered arrangement 440 is a transmission order for the packets that is an expected order of transmission. Thus, an order in the queue 240 is a final order for the packets in a single transmission stream that is released onto the network.

As illustrated in FIG. 4, packet 1a is a first packet into the queue 240 since the packet 1a has an earliest launch time. The packet 1a is in a first in spot at a head of the queue and will thus be the first packet to be transmitted as illustrated. By contrast packet 5a is a last-in packet at a tail of the queue 240 and will be the last packet to be transmitted as illustrated. Of course, as additional packets are received and as packets are released from the queue 240, packets migrate from the last-in position to the first-in position where they are released.

FIG. 4 also illustrates two conflicts between packets. Conflicts 450 and 460 illustrate how the queue arbiter 230 resolves conflicts between packets of separate streams/virtual queues when launch times conflict. For example, at conflict 450, packet 2c conflicts with packet 3b since they both have a same launch time as illustrated by a same placement along the respective timelines. However, because virtual queue b has, for example, a higher priority, packet 3b is placed in the queue prior to packet 2c. Thus, packet 2b will be transmitted before packet 3b. Similarly, packet 8b has priority over packet 5c for conflict 460.

As an additional consideration, because packets that conflict have a same launch time, a second packet (e.g., 2c and 5c) may have an additional indicator (e.g., toggle bit or queue indicator) set when the conflict is resolved. In this way, even though lower priority conflicting packets will not be released at their exact launch time, the network arbiter 250 can more easily recognize that a launch time for the packets has passed and, thus, immediately issue those packets.

Furthermore, the network arbiter 250 is configured to release packets from the queue 240 when a launch time for each successive packet is a current time. The network arbiter 250 proceeds to release packets by releasing a packet at a head (i.e., first-in) of the queue 240 when a launch time of that packet is a current time. Thus, as illustrated packets would be released in the order of 1a, 1b, 1c, 2b, 2a, 3b, 2c, 4b, 3a, 3c and so on while additional packets are added to a last-in location. In this way, the device 200 uses a single FIFO queue 240 to merge packets that would otherwise be distributed between multiple queues.

Figure 5:
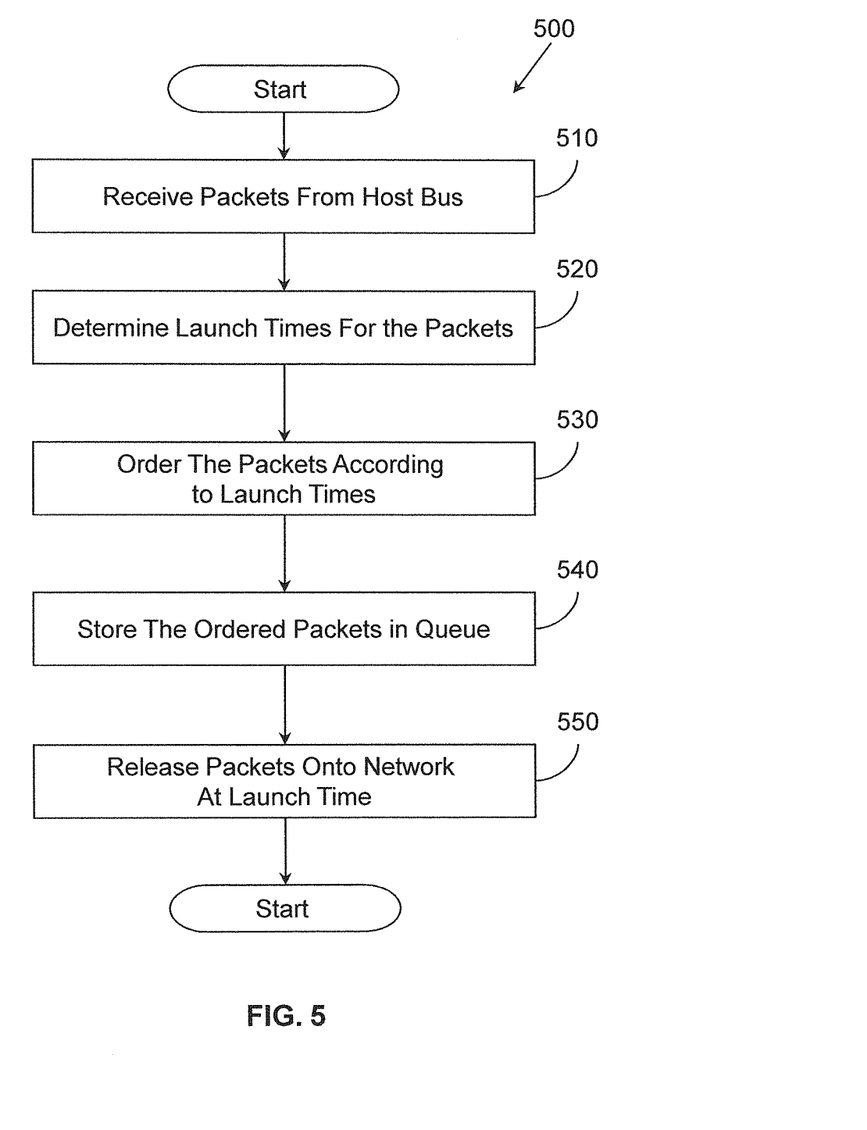
FIG. 5 illustrates one embodiment of a method associated with merging multiple queues into a single queue by pre-ordering packets.

Further aspects of using a single FIFO queue for multiple data streams will be discussed with reference to FIG. 5. FIG. 5 illustrates one embodiment of a method 500 associated with improved audio-video bridging (AVB) and TSN with a single queue.

At 510, packets are received from a host bus. In general, the packets are received at an interface in a host device between the host bus and a network interface card (NIC) or other communication pathway to a network.

In one embodiment, the packets include multiple data streams. The multiple data streams may be audio video bridging (AVB) data streams, generic data and so on. In either case, each of the data streams is, for example, assigned to one of a set of virtual queues that are each associated with different transmission characteristics for providing the packets over a network to remote devices. The transmission characteristics include different attributes for how a packet or a stream of packets may be transmitted. For example, the transmission characteristics may include class of service, bandwidth allocation and so on.

Furthermore, the host bus is part of a host device that provides the packets to the remote devices. In general, the host device is a computing device that communicates with one or more remote devices over a network (e.g., the Internet). In one embodiment, the host device is a multimedia server or other multimedia device.

Accordingly, as the packets are received from the host bus, the packets are distributed to a DMA/shaper unit associated with a virtual queue that is assigned to a respective packet.

At 520, launch times for packets received from the host bus are determined. As discussed previously, depending on a type of the packet, determining a launch time includes calculating the launch time or simply retrieving the launch time from the packet. The launch time is the time at which the packet is expected to be transmitted/released onto the network.

Accordingly, at 530, the launch times determined at 520 are used to order the packets. In one embodiment, the packets are ordered into a transmission order. The transmission order is an order in which the packets are expected to be transmitted in a single stream on the network. Thus, ordering the packets merges the packets from multiple virtual queues into a single stream in one queue. In this way, a single queue can be used when, for example, performing audio video bridging instead of using multiple hardware queues.

At 540, the ordered packets are stored in the single queue. In one embodiment, the queue is a First-In First-out (FIFO) queue. By using a FIFO queue to store the ordered packets the transmission order can be maintained and the packets can be released onto the network in a final order from the queue at 550.

At 550, the packets are released from the queue in a first-in first-out basis. In one embodiment, releasing the packets includes releasing a packet from the queue when a launch time for the packet matches a current time and when the packet is next in the transmission order to be sent. Thus, the single queue can be used for providing the packets onto the network.

Figure 6:
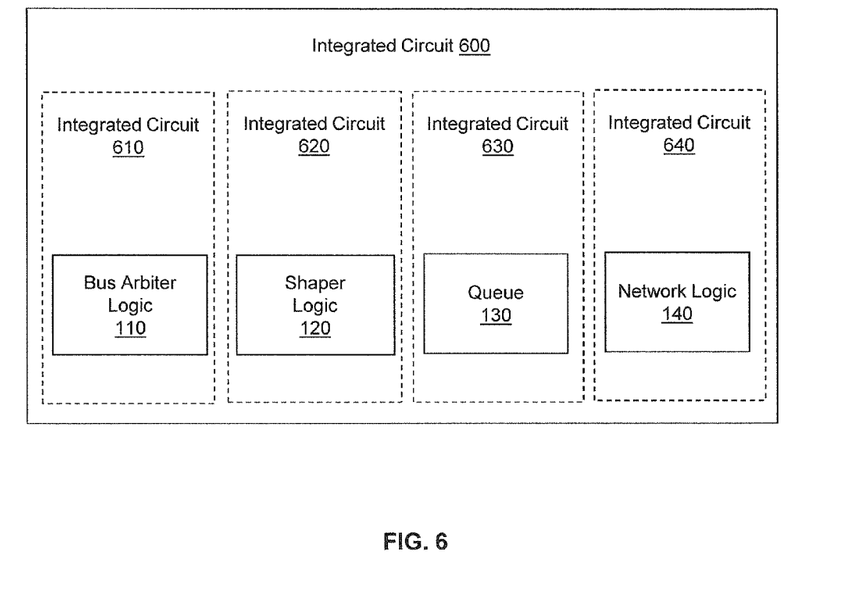
FIG. 6 illustrates one embodiment of an integrated circuit associated with systems and methods discussed herein.

FIG. 6 illustrates an additional embodiment of the apparatus 100 from FIG. 1 that is configured with separate integrated circuits and/or chips. In this embodiment, the bus arbiter logic 110 from FIG. 1 is embodied as a separate integrated circuit 610. Additionally, the shaper logic 120 is embodied on an individual integrated circuit 620. The queue 130 is also embodied on an individual integrated circuit 630 or memory device. Lastly, the network logic 140 is embodied on an individual integrated circuit 640. The circuits are connected via connection paths to communicate signals. While integrated circuits 610, 620, 630 and 640 are illustrated as separate integrated circuits, they may be integrated into a common integrated circuit board 600. Additionally, integrated circuits 610, 620, 630 and 640 may be combined into fewer integrated circuits or divided into more integrated circuits than illustrated. In another embodiment, the bus arbiter logic 110, the shaper logic 120, the queue 130 and the network logic 140 (which are illustrated in integrated circuits 610, 620, 630 and 640, respectively) may be combined into a separate application-specific integrated circuit. In other embodiments, portions of the functionality associated with the bus arbiter logic 110 and the shaper logic 120 may be embodied as firmware executable by a processor and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. An apparatus, comprising:
 a processor connected to memory; and
  shaper logic stored within the memory and executable by the processor, the shaper logic including a plurality of shapers where each shaper receives and stores a different packet stream of packets and where each of the shapers are configured to (i) respectively determine launch times for the packets received from a host bus, and (ii) order the packets into a transmission order according to the launch times, wherein the launch times are expected transmission times for the packets that are provided according to one or more attributes associated with each respective one of the packets; and
  a queue arbiter stored within the memory and executable by the processor, the queue arbiter including a multiplexer connected to each of the plurality of shapers, wherein the queue arbiter is configured to merge the packets from the plurality of shapers into a single queue and order the merged packets in the single queue based at least in part on the launch times of the packets;
  wherein the single queue includes a single buffer that is configured to store the packets from the queue arbiter in a merged transmission order; and a network arbiter stored within the memory and executable by the processor, the network arbiter being (i) connected to the single queue and (ii) configured to:
release the packets from the single queue for transmission onto a network in a single combined stream in the merged transmission order;
identify a conflict where a first packet of a first stream and a second packet of a second stream have a same launch time and, in response to identifying the conflict, set a toggle bit in the second packet;
check that the launch time of the first packet matches a current time and transmit the first packet; and
read the toggle bit set within the second packet, wherein based on the toggle bit, the second packet is transmitted immediately after transmission of the first packet from the first stream without checking a launch time of the second packet with the current time, wherein the second packet is assigned to the second stream different than the first stream.

2. The apparatus of claim 1, further comprising:
bus arbiter logic stored within the memory and executable by the processor, the bus arbiter logic configured to receive the packets from a host bus and provide the packets to the shaper logic, wherein the bus arbiter logic is configured to distribute the packets to the plurality of shapers within the shaper logic according to the one or more attributes of each packet, wherein the one or more attributes include a class of service, a priority or a bandwidth allocation, wherein the shapers are configured to calculate a launch time for one or more of the packets that are not time aware, and wherein packets that are not time aware are not sensitive to a delivery time at a client device.

3. The apparatus of claim 1, wherein the toggle bit comprises a queue indicator indicative of a virtual queue associated with the second stream from which the second packet was received.

4. The apparatus of claim 1, wherein a shaper is configured to:
calculate a launch time for a not time aware packet according to an allocated bandwidth for the not time aware packet, a packet size of a previously transmitted packet with respect to the not time aware packet, and a launch time of the previously transmitted packet with respect to the not time aware packet.

5. The apparatus of claim 1, wherein the single queue is a First-In First-out (FIFO) queue wherein the packets are input to the single queue based on the launch time of the packets, wherein the packets are assigned to virtual queues that are each associated with a different class of service, wherein the queue merges the packets together by combining the packets into the queue in the transmission order for being sent on the network.

6. The apparatus of claim 1, wherein the shaper logic is configured to resolve a conflict between two of the packets with a launch time that is equal by selecting one of the two with a higher priority or class of service, and wherein the merged transmission order is a final order for providing the packets on the network in a single stream.

7. The apparatus of claim 1, wherein the packets include multiple data streams received from a host bus, wherein each of the multiple data streams is assigned to one of a set of virtual queues that each have different transmission characteristics, wherein at least one of the multiple data streams includes packets for audio video bridging (AVB), and wherein packets for the set of virtual queues are stored in the queue in the transmission order before being released onto the network.

8. A method, comprising:
distributing packets received from a host bus to a plurality of shapers according to one or more attributes of each of the packets for ordering;
determining, in each of the plurality of shapers, launch times for the packets stored in the respective shaper;
ordering the packets in each of the plurality of shapers into a transmission order according to the launch times of the packets in the respective shaper, wherein the launch times are expected transmission times for the packets, and wherein the launch times are provided according to the one or more attributes associated with each respective one of the packets;
merging, by a queue arbiter connected to each of the plurality of shapers, the packets from each of the plurality of shapers into a single queue and ordering the merged packets in the single queue based at least in part on the launch times of the packets, wherein the single queue stores the packets from the queue arbiter in a merged transmission order; and
releasing the packets from the single queue and transmitting the packets onto a network in a single combined stream in the merged transmission order;
identifying a conflict where a first packet of a first stream and a second packet of a second stream have a same launch time and, in response to identifying the conflict, set a toggle bit in the second packet;
checking that the launch time of the first packet matches a current time and transmit the first packet; and
reading the toggle bit set within the second packet, wherein based on the toggle bit, the second packet is transmitted immediately after transmission of the first packet from the first stream without checking a launch time of the second packet with the current time, wherein the second packet is assigned to the second stream different than the first stream.

9. The method of claim 8,
wherein releasing the packets from the single queue includes releasing the packets on a first-in first-out basis, wherein releasing the packets includes releasing a packet of the packets from the queue when a launch time for the packet matches a current time and when the packet is next in the transmission order to be released.

10. The method of claim 9, wherein releasing the packets includes releasing two consecutive packets in the transmission order that have a same launch time according to a toggle bit in a second of the two consecutive packets, and wherein the toggle bit indicates that the second packet has the same launch time as a previous packet that was already transmitted.

11. The method of claim 8, further comprising:
receiving the packets from the host bus, wherein the one or more attributes include a class of service, a priority or a bandwidth allocation, wherein storing the packets includes storing each whole packet of the packets in the single queue,
wherein determining the launch times includes calculating a launch time for one or more of the packets that are not time aware, and wherein packets that are not time aware are not sensitive to a delivery time at a client device.

12. The method of claim 8, wherein storing the packets in the single queue includes storing the packets in a First-In First-out (FIFO) order based on the launch times of the packets, wherein the packets are assigned to virtual queues that are each associated with a different class of service, and wherein storing the packets in the single queue merges the packets together by combining the packets from multiple streams into the single queue in the transmission order for being sent on the network.

13. The method of claim 8, wherein ordering the packets includes resolving a conflict between two or more of the packets with a same launch time by selecting one of the two or more packets that has a higher priority or class of service, and wherein the transmission order is a final correct order for providing the packets on the network in the single stream.

14. The method of claim 8, wherein receiving the packets includes receiving the packets in multiple data streams from the host bus, wherein each of the multiple data streams is assigned to one of a set of virtual queues that each have different transmission characteristics, wherein at least one of the multiple data streams includes packets for audio video bridging (AVB) or Time Sensitive Network (TSN), and wherein storing the packets includes storing the packets for the set of virtual queues in the transmission order before being sent on the network.

15. A device comprising:
   a processor connected to memory; and
   a plurality of shapers stored within the memory and executable by the processor, wherein the plurality of shapers are connected to a bus-side arbiter, wherein the bus-side arbiter provides packets from a host bus to the plurality of shapers, and wherein each of the plurality of shapers are configured to respectively determine a launch time for each of the packets according to transmission characteristics of each of the packets, and wherein the plurality of shapers each include an output;
   a queue arbiter stored within the memory and executable by the processor, wherein the queue arbiter is connected to outputs from each of the plurality of shapers, and wherein the queue arbiter is configured to merge the packets from the plurality of shapers into a single queue and order the merged packets in the single queue based at least in part on the launch times of the packets;
   wherein the single queue includes an input connected to the queue arbiter, wherein the queue is a single buffer that is configured to store the packets in a merged transmission order for transmission as arranged by the queue arbiter; and
   a network arbiter stored within the memory and executable by the processor, wherein the network arbiter is (i) connected to the single queue and (ii) configured to:
      release the packets from the single queue for transmission onto a network in a single combined stream in the merged transmission order;
      identify a conflict where a first packet of a first stream and a second packet of a second stream have a same launch time and, in response to identifying the conflict, set a toggle bit in the second packet;
      check that the launch time of the first packet matches a current time and transmit the first packet; and
      read the toggle bit set within the second packet, wherein based on the toggle bit, the second packet is transmitted immediately after transmission of the first packet from the first stream without checking a launch time of the second packet with the current time, wherein the second packet is assigned to the second stream different than the first stream.

16. The device of claim 15, wherein the queue arbiter is configured to resolve conflicts between packets that have a same launch time according to the transmission characteristics of the packets, wherein the transmission characteristics include a transmission priority, a bandwidth allocation or a class of service.

17. The device of claim 15,
   wherein the network arbiter includes an input connected to an output of the single queue, wherein the network arbiter is configured to provide packets from the single queue onto the network, wherein the plurality of shapers are configured to calculate a launch time for packets that are not time aware according to an allocated bandwidth associated with a packet, a packet size of a previously transmitted packet and a launch time of the previously transmitted packet, wherein the single queue is a first-in first-out (FIFO) queue,
   and wherein packets that are not time aware are not sensitive to a delivery time at a client device.

18. The device of claim 17, wherein the network arbiter is configured to provide a packet from the single queue onto the network when an actual time equals a launch time of the packet and the packet is a next packet in the queue.

19. The device of claim 15, wherein each of the plurality of shapers receives packets that are assigned to one of a set of virtual queues, wherein the set of virtual queues each have a different transmission characteristic, and wherein the launch time for each of the packets is a time when each of the packets is to be transmitted to maintain a continuous stream of data to a remote device that is receiving the packets.

20. The device of claim 15, wherein the single queue merges streams of packets associated with multiple virtual queues into the order for transmission to provide a single stream onto the network.

\* \* \* \* \*